Nov. 3, 1931.  E. E. EINFELDT  1,829,823
TRACTION CLEAT FOR WHEELS
Filed Dec. 24, 1928  2 Sheets-Sheet 1
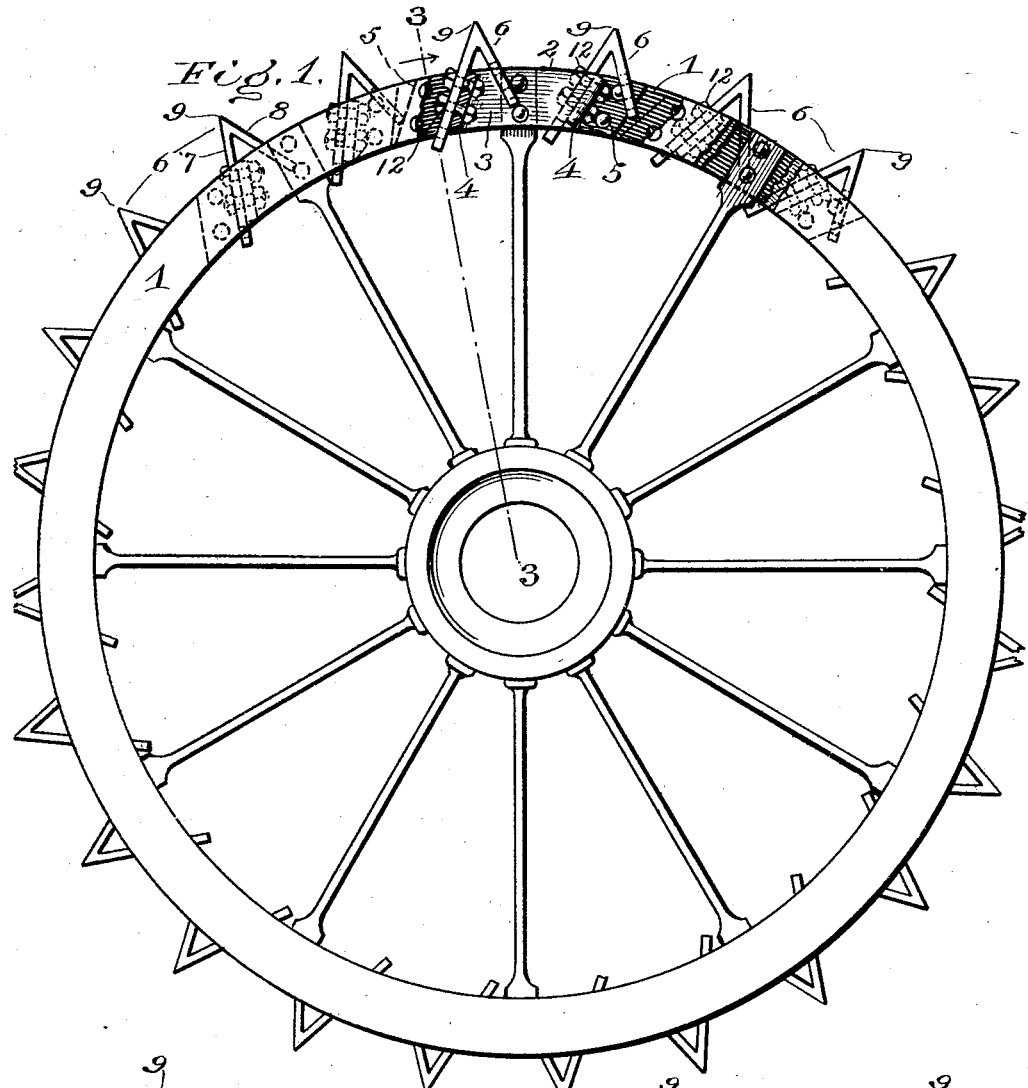
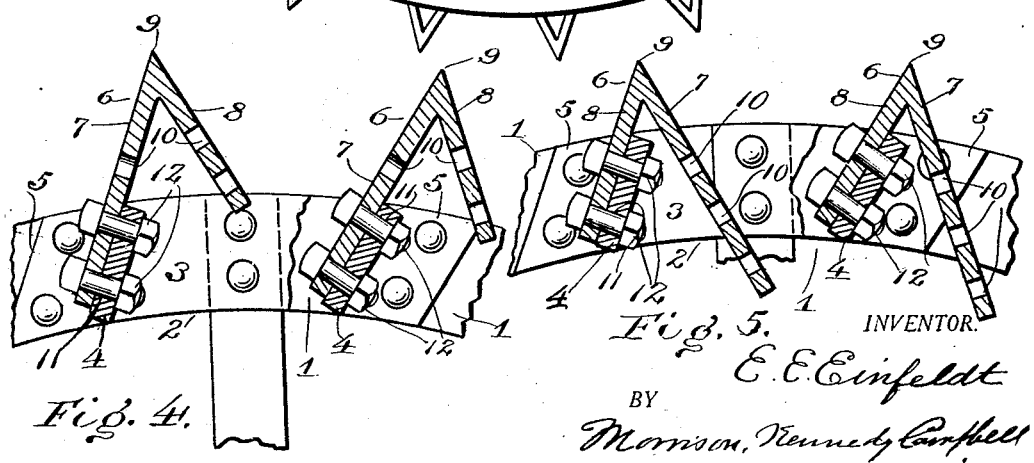

Nov. 3, 1931.　　　　E. E. EINFELDT　　　　1,829,823
TRACTION CLEAT FOR WHEELS
Filed Dec. 24, 1928　　　2 Sheets-Sheet 2
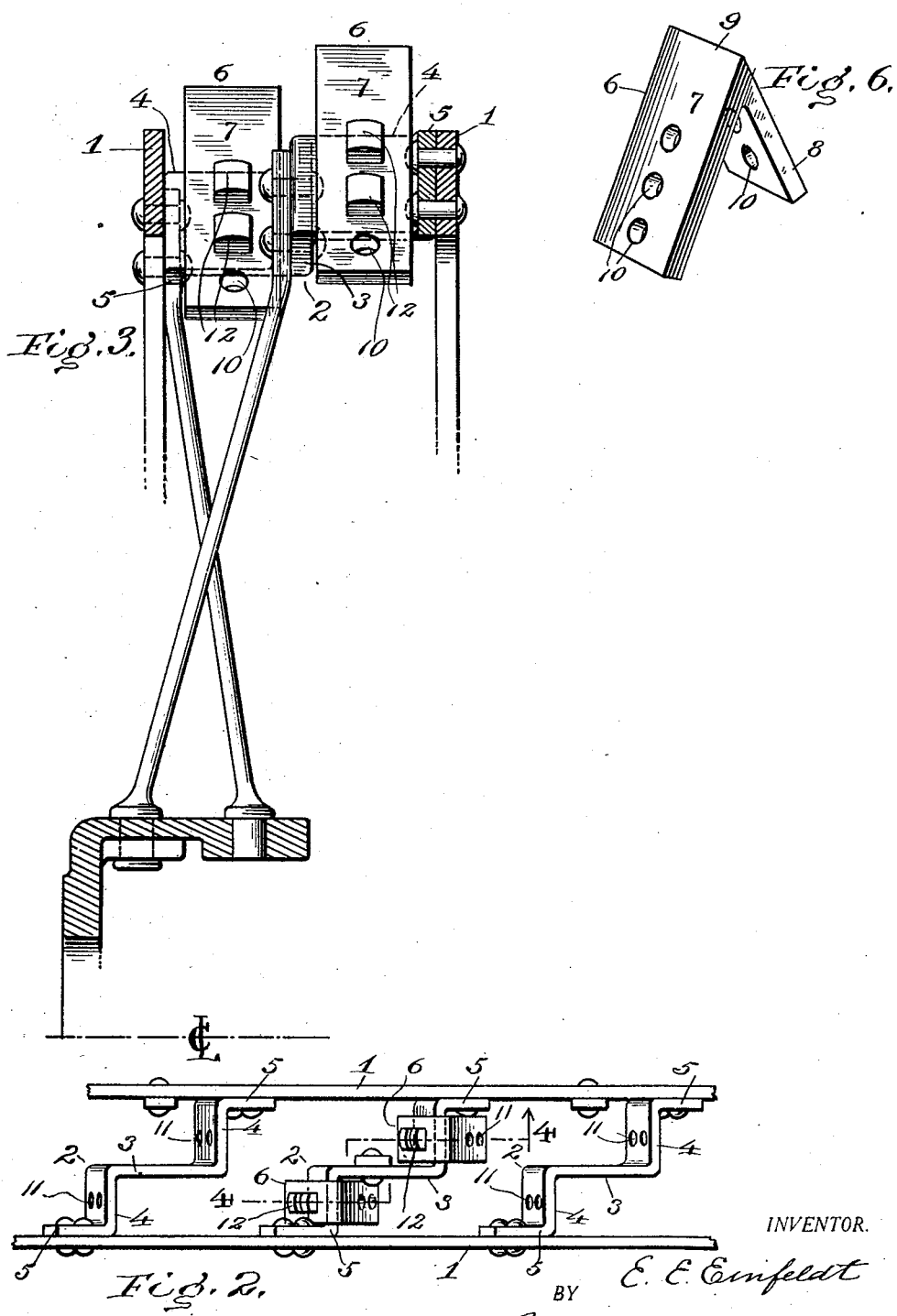
INVENTOR.
E. E. Einfeldt
BY
Morrison, Kennedy & Campbell
ATTORNEYS.

Patented Nov. 3, 1931

1,829,823

UNITED STATES PATENT OFFICE

ERNEST E. EINFELDT, OF DAVENPORT, IOWA, ASSIGNOR TO FRENCH & HECHT, INCORPORATED, A CORPORATION OF IOWA

TRACTION CLEAT FOR WHEELS

Application filed December 24, 1928. Serial No. 328,206.

This invention relates to traction wheels and has reference more particularly to the traction cleats or lugs with which the rim of the wheels is equipped for the purpose of giving the same tractive effects.

In the use of tractors for instance, in which it is demanded that the carrying wheels possess tractive effects produced by the employment of traction cleats or lugs applied to the wheel rim, the different ground conditions met with demand different degrees of engagement of the cleats with the ground, which is ordinarily taken care of by employing cleats or lugs of different shapes or sizes.

The aim of the present invention is to provide a traction cleat or lug which, as a unitary member or structure, may be applied detachably to the wheel rim in different or reversed positions to give different degrees of engagement with the ground, and with these and other objects in view, the invention consists of the improved form and construction of the cleat, which will be described in detail in the specification to follow, and the novel features of which will be set forth in the appended claims.

In the accompanying drawings:

Figure 1 is a side elevation of a wheel equipped with the improved traction cleats, with parts broken away and parts in section;

Fig. 2 is a plan view of a portion of the wheel rim on an enlarged scale;

Fig. 3 is a sectional elevation on an enlarged scale on the line 3—3 of Fig. 1.

Figs. 4 and 5 are fragmentary sectional views of the wheel rim, showing the different positions of the traction cleats to give different tractive effects in the two cases, the section being taken on the line 4—4 of Fig. 2;

Fig. 6 is a perspective view of one of the traction cleats detached.

Referring to the drawings, which show the improved cleat in its preferred form and as applied to an open type of wheel, the rim of the wheel consists of two spaced flat annular members or rings 1, 1, which are connected fixedly together and their spaced relation maintained, by means of connecting members or bracket plates 2, 2, etc., each comprising a central longitudinal body 3, laterally extending supporting wings 4 at the ends of the central portion and angularly related to the perimeter of the wheel, and longitudinally extending terminal portions or feet 5 at the ends of the supporting portions, which feet are fastened firmly, as by riveting or otherwise, to the inner sides of the rings 1. These connecting members may be variously formed and constructed to serve their intended purposes, and in the present instance are each formed as an integral structure from a single metal plate or strip, bent at its ends to provide the supporting portions and the attaching feet.

The wings 4 of the connecting members serve as a means for the attachment to the wheel of the improved traction cleats 6, which, in the preferred form of the invention consist each of two legs or limbs 7 and 8, which limbs are disposed at an angle to each other and are connected together at their intersection to form an active traction edge or point 9 at the apex of the angle.

The cleats are applied to the wheel by seating the inner sides of the limbs against the supporting portions 4 of the connecting members 3, the said limbs being provided with bolt holes 10 and the supporting portions being likewise provided with bolt holes 11 to receive fastening bolts 12, by means of which the cleats are firmly fastened in place.

When so fastened to the supporting wings of the connecting members, the tractive edges or points 9 of the cleats will project beyond the rim of the wheel and thus form traction lugs with diverging front and rear sides constituted by the two limbs 7 and 8, which points of the lugs may be caused to project a greater or less distance from the surface of the rim by providing each limb with a plurality of bolt holes, in the present instance three holes in the longer limb 7 and two holes in the shorter limb 8, which holes in the two limbs are arranged in staggered relation to each other. This will adapt the cleats to be fastened to the supporting wings of the connecting members as shown respectively in Figs. 4 and 5, the attachment of the cleats by means of the longer limbs 7 giving a greater degree of projection into the ground than when the attachment is effected by the other limbs, due to the staggered relations of the holes in the two limbs.

In Fig. 4 the cleats are shown as attached by means of the limbs 7, giving the maximum degree of projection, while in Fig. 5 they are shown as attached by means of the limbs 8 to give a minimum degree of projection. It will be seen therefore that the cleats are effective when attached by either of their two limbs, and when so attached, will give different degrees of tractive effect or projection into the ground. Due to the fact that the limb 8 has but two bolt holes, whereas the other limb has three, the limb 8 may be made shorter than the limb 7, in order to economize in the material.

The limbs of the cleats 6 are shown as being of relatively different lengths, the limb 7 which has the greater number of holes being longer than the limb 8 having the lesser number, whereby a considerable saving in the material is effected in the formation of the cleats, and interference of the adjacent limbs of the cleats with each other will be avoided in the assemblage of the cleats on the wheel rim. It will be understood however, that the invention is not limited to such difference in the lengths of the two limbs, as the two limbs might be made of the same length, without departing from the limits of the invention.

While in the foregoing description and accompanying drawings the invention is shown as embodied in certain detailed forms and arrangement of parts, it will be understood that these details may be changed by the skilled mechanic without departing from the limits of the invention; and further it will be understood that the invention is not limited to any particular form of construction of the parts, except in so far as such limitations are specified in the claims.

Having thus described my invention, what I claim is:—

1. In combination with a wheel rim provided with transversely extending supporting wings angularly related to the perimeter of the wheel, traction cleats each comprising two limbs connected together in angular relations to each other to form an active traction point at the apex of the angle, each of said limbs being formed with means whereby it may be fastened to one of the transversely extending supporting wings to present the traction point of the cleat for contact with the ground, said means on the two limbs being so relatively disposed that the traction point may be caused to project different distances beyond the tread of the wheel, according to which of the two limbs is employed in fastening the cleat in place.

2. The combination of elements set forth in claim 1, characterized by the fact that the limbs of a traction cleat are provided with holes for attaching the cleat to the rim, said holes in one of the limbs being staggered in relation to those in the other limb; whereby the effective traction point of the cleat may be caused to project different distances beyond the tread of the wheel, according to which of the two limbs is employed in fastening the cleat in place.

In testimony whereof, this specification has been duly signed by:

ERNEST E. EINFELDT.